United States Patent Office 3,366,665
Patented Jan. 30, 1968

3,366,665
NITRATE ESTERS OF DIFLUOROAMINO ALKYL ETHERS
William E. Tyler III, New Providence, N.J., assignor to Esso Research and Engineering Company, a corporation of Delaware
No Drawing. Filed May 10, 1962, Ser. No. 195,017
5 Claims. (Cl. 260—467)

This invention relates to novel nitrate esters synthesized by an addition reaction of nitric acid with an ether having a vinyl or ethylenic carbon group R interlinked by oxygen to an organic group R' in an ether, ROR'.

In a preferred embodiment, the present invention is concerned with the preparation of energetic compounds, such as 1,2-bis-(difluoramino)-1' nitroxy diethyl ether by nitration of 1,2-bis-($NF_2$) vinyl ethyl ether by addition of $HNO_3$.

Prior to the present invention, efforts to obtain nitric acid esters of ethylene compounds usually resulted in the formation of various compounds such as nitrosites, nitrosates, nitro-nitrates, depending on the nitrating agent, conditions, and ethylenic compound reactant. Only in the reaction of an olefin having a tertiary carbon atom, such as trimethyl ethylene or isobutylene, has an alkane nitric ester been obtained by direct addition of nitric acid; and these tertiary alkyl nitrates, on standing at room temperature, tend to decompose.

In accordance with the discovery of the present invention, a relatively stable nitric ester is obtained by addition of $HNO_3$ to an ethylenic group in a mixed ether, even with no tertiary carbon atom in the ethylenic group. Also, no cleavage occurred at the ether linkage.

The general reaction of interest for synthesis of the nitric esters of the mixed ethers is represented by the following equation:

$CH_2=CH_2-O-CH(X)-CH_2(X) + HNO_3 \longrightarrow$

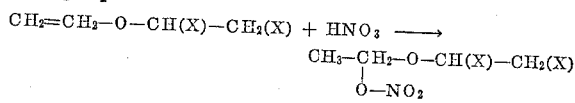

The X constituent in the ether reactant stands for H, a halogen, nitro group, or $NF_2$ group, or a variety of such groups. Thus far, the best results were obtained when the ether had an $NF_2$ group as the X component on the carbon atom alpha to the oxygen.

Care has to be taken to maintain control of the temperture, to use high purity $HNO_3$, and a suitable diluent, preferably methylene dichloride.

The following examples illustrate the procedure:

Example 1

To 1.8 g. of 1,2-bis-(difluoramina) ethyl vinyl ether, $CH_2:CH \cdot O \cdot CH(NF_2)CH_2(NF_2)$, in 75 cc. $CH_2Cl_2$ cooled to 2° C. was added 2 ml. of white 99% $HNO_3$. The mixture was stirred at 2° C. for 30 minutes, then at room temperature (25° C.) for 1 hour. The mixture was again cooled to 2° C. and neutralized with 6 g. of urea. After the neutralized mixture came to room temperature, it was stirred overnight, then filtered to remove solids. The diluent was removed by vaporization from the filtrate warmed on a water bath. A colorless liquid was distilled from the residual liquid and the distillate was caught in a wet ice trap. Gas chromatography showed the distillate product to be 90% pure. This product had the following analysis:

Calculated for $C_4H_7F_4N_3O$, percent: C, 20.4; N, 17.6; F, 33.0. Found, percent: C, 20.3; N, 17.7; F, 32.2.

The chemical analysis, the infrared spectrum, and the nuclear magnetic resonance spectrum are consistent with the following structure:

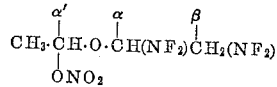

This product may be called α,β-bis-(difluoramino)-α' nitrato diethyl ether, or 1,2-bis-(difluoramino)-1'-nitroxy diethyl ether. This compound can supply oxygen and fluorine advantageously in rocket propellant and composite explosives.

Example 2

In carrying out the nitration of the vinyl group in vinyl ethyl ether using absolute $HNO_3$ and a diluent as described in Example 1, the reaction mixture remained white while maintained at a temperature in the range of −70° to −20° C., but became discolored and blackened when the temperature was allowed to rise. By adding the urea to the cooled mixture at a temperature below −30° C., the neutralization prevented undesired oxidation reaction so that the product obtained had the desired composition of α-nitroxy diethyl ether, $$CH_3CH_2(ONO_2)O \cdot C_2H_5$$

This had relatively low energy value, but has value as an intermediate for use as an oxidizing agent and for use in biochemistry.

The principles set forth are to be used for direct $HNO_3$ addition reaction with other ROR' ethers, such as divinyl ether, diallyl ether, vinyl chloroethyl ethers, vinyl butyl ether, vinyl isobutyl ether, vinyl methyl ether, 2-ethoxy-1,3-butadiene, vinyl 2-ethylhexyl ether, and such compounds having negative functions, e.g. halogen, $NF_2$, or nitro functions as adducts or substituents in the R' group.

Products which are to be obtained may be represented by the general formula:

$$RCH_2CH(ONO_2)OR'$$

in which R is of the group consisting of H, hydrocarbon radical, and a hydrocarbon radical having a substituent function, and in which R' is of the group consisting of hydrocarbon radical and hydrocarbon radical having a substituent function, e.g. halogen, $NF_2$, and nitro functions.

What is claimed is:

1. A nitrate ester having the formula:

$$RCH_2CH(ONO_2)OR'$$

in which R is of the group consisting of H, alkyl radical, and alkyl radical having a substituent $NF_2$ function, and in which R' is of the group consisting of a alkyl radical and a alkyl radical having a substituent $NF_2$ function.

2. 1,2-bis(difluoramino)-1' nitroxy diethyl ether having the composition:

$$CH_3CH(ONO_2)OCH(NF_2)CH_2(NF_2)$$

3. Process for synthesis of a nitrate ester having an ether linkage, which comprises reacting $HNO_3$ with an ethylenically unsaturated aliphatic ether at a reaction temperature that minimizes oxidation, neutralizing acidity in the resulting reaction mixture, and recovering as the nitrate ester product the ether adduct of $HNO_3$.

4. Process as defined in claim 3 wherein the $HNO_3$ is 98 to 100% $HNO_3$, the unsaturated ether is dissolved in $CH_2Cl_2$, and the reaction temperature is in the range of —70° to 40° C., and the acidity is neutralized by admixed urea.

5. Process for synthesis of 1,2-bis-(difluoramino)-1' nitroxy diethyl ether, which comprises reacting 1,2-bis-(difluoramino) ethyl vinyl ether with absolute $HNO_3$ dissolved in $CH_2Cl_2$ at about 0° to 25° C. to add the $HNO_3$ to the vinyl radical, neutralizing acidity of the resulting reaction mixture by admixing urea, and recovering 1,2-bis-(difluoramino)-1' nitroxy diethyl ether as product.

References Cited
UNITED STATES PATENTS 1,936,020  11/1933  Hough _____ 260—467

OTHER REFERENCES

Michael et al., JACS 57 at page 1268 (1935), QDIA5.

CARL D. QUARFORTH, *Primary Examiner.*

OSCAR R. VERTIZ, *Examiner.*

J. M. WHISLER, L. A. SEBASTIAN,
*Assistant Examiners.*